United States Patent [19]
Inoue et al.

[11] Patent Number: 6,041,184
[45] Date of Patent: Mar. 21, 2000

[54] CAMERA HAVING A VISUAL LINE DETECTION DEVICE

[75] Inventors: Hideya Inoue, Yokohama; Masami Takemoto, Urawa, both of Japan

[73] Assignee: Nikon Corporation, Tokyo, Japan

[21] Appl. No.: 08/820,548

[22] Filed: Mar. 19, 1997

Related U.S. Application Data

[63] Continuation of application No. 08/691,382, Aug. 2, 1996, abandoned, which is a continuation of application No. 08/305,740, Sep. 14, 1994, abandoned, which is a continuation of application No. 08/141,994, Oct. 28, 1993, abandoned.

[30] Foreign Application Priority Data

Oct. 30, 1992 [JP] Japan ..................................... 4-293379

[51] Int. Cl.[7] .................................................. G03B 17/00
[52] U.S. Cl. .............................. 396/51; 396/121; 396/234
[58] Field of Search .............................. 396/51, 121, 122, 396/123, 233, 234

[56] References Cited

U.S. PATENT DOCUMENTS

| | | | |
|---|---|---|---|
| 4,574,314 | 3/1986 | Weinblatt | 354/400 |
| 4,836,670 | 6/1989 | Hutchinson | 354/62 X |
| 5,335,035 | 8/1994 | Maeda | 354/219 |
| 5,386,258 | 1/1995 | Nagano | 354/400 |
| 5,606,390 | 2/1997 | Arai et al. | 396/51 |
| 5,623,703 | 4/1997 | Takagi et al. | 396/51 |

*Primary Examiner*—W. B. Perkey

[57] ABSTRACT

A camera which performs visual line detection, and which assigns priority to photography when a release operation is performed during calibration information input for visual line detection. The camera includes an input unit to input into the camera calibration information relating to an eye of a photographer. The calibration information is automatically input when the photographer contacts an eyepiece of a viewfinder. A calculation unit calculates the visual line of the photographer, based upon the input calibration information and the state of the eye of the photographer looking through the viewfinder. A setting unit sets photographic conditions based upon the calculated visual line. When a release operation is performed during the action of calibration information input, a priority action execution unit suspends the input of calibration information, and the priority action execution unit actuates a photographic unit such that photography may be performed. Further, previously input calibration information is overwritten with the latest data such that calibration information for the present photographer is automatically input.

68 Claims, 7 Drawing Sheets

CAMERA HAVING A VISUAL LINE DETECTION DEVICE

This application is a continuation of application Ser. No. 08/691,382, filed Aug. 2, 1996, now abandoned, which is a continuation of application Ser. No. 08/305,740, filed Sep. 14, 1994, now abandoned, which is a continuation of application Ser. No. 08/141,994, filed Oct. 28, 1993 now abandoned.

BACKGROUND OF THE INVENTION

1. Field of the Invention

The present invention relates to a camera having a visual line detection device, and more particularly to a camera which assigns priority to photography when a release operation is performed during the input of calibration information for determination of the visual line of a photographer.

2. Description of the Related Art

Cameras are known which have a visual line detection device to determine the visual line of a photographer. For example, a camera is disclosed in Japanese Laid-Open Patent Publication No. 1-274736 ("JP-A-1-274736") in which the visual line of a photographer is determined by a light beam which shines on the eyeball of a photographer looking into a viewfinder. The light is reflected from the cornea, and the whole eyeball is imaged on a CCD area sensor by a condensing lens. The center position of the pupil and the position of the reflected light are then determined from this image. A region within the viewfinder which the photographer is scrutinizing may be detected by calculating the angle of rotation of the eye based upon the information obtained from the image of the eyeball.

Errors in the calculated visual line tend to arise when average values are used to calculate the visual line of the photographer, and individual differences between photographers are ignored. For example, the size of the eyeball and the visual axis of the eyeball may differ between photographers. Further, the visual line of a photographer is affected when contact lenses or spectacles are worn when looking through the viewfinder, as opposed to when a "naked eye" is used to look through the viewfinder. Therefore, in order to prevent errors from arising when calculating a visual line, the known cameras having a visual line detection device input information relating to the eyes of respective individual photographers into the camera before calculating a visual line.

For example, the input information relating to the eye of a photographer may be performed according to techniques described in a Japanese brochure for the Canon EOS 5 camera, or in the Japanese publication "CAMERAMAN", October, 1992, page 24. These techniques are described below.

(1) A calibration mode on a mode selection dial is selected, and a selected calibration number is set. For example, if there are five calibration numbers, calibration data related to five people can be input into the camera. When the calibration mode is selected a first reference mark blinks at a first position within the viewfinder.

(2) While looking into the viewfinder and scrutinizing the first reference mark, the photographer half depresses a release button. A CCD area sensor images the photographer's eyeball at this time and stores the image information in memory.

(3) When the half depression of the release button is discontinued, the first reference mark is extinguished. A few seconds later, a second reference mark blinks at a second position within the viewfinder.

(4) While looking into the viewfinder and scrutinizing the second reference mark, the photographer half depresses the release button. The CCD area sensor images the photographer's eyeball at this time and stores the image information in memory.

(5) Based upon the output signals obtained from the CCD when the first and second reference marks were scrutinized, information relating to the photographer's eyeball is calculated and stored in memory.

However, the known cameras having a visual line detection device suffer from the drawback that there is a risk of missing a chance to take a photograph because the shutter does not operate during the calibration mode operation, even if the release button is fully depressed.

SUMMARY OF THE INVENTION

It is therefore an object of the present invention to provide a camera which is capable of performing photography even during the input of calibration information for visual line detection.

Another object of the present invention is to provide a camera which automatically inputs calibration information for performing visual line detection.

It is a further object of the present invention to provide a camera which does not require additional memory space to store identification data for plural photographers.

It is yet a further object of the present invention to provide a camera which indicates an error in calibration information input.

It is still a further object of the present invention to provide a camera which suspends the action of inputting calibration information during visual line detection, and gives priority to photography when a release operation is performed.

The above objects are achieved by providing a camera with a visual line detection device which includes an input unit to input calibration information related to the eye of a photographer, and a calculation unit which calculates a visual line of the photographer based on the input calibration information and the state of the eye of the photographer looking through a viewfinder. Photographic conditions are set based upon the calculated visual line. When a release operation is performed during the action of the input unit, the input action of the input unit is suspended by a priority operation execution unit, and a photographic unit is actuated in response to the release button such that photography may be performed even during the input of calibration information. Further, a detection unit detects eyepiece contact with the viewfinder by a photographer such that the input of calibration information may automatically begin.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DESCRIPTION OF THE PREFERRED EMBODIMENTS

Reference will now be made to the present preferred embodiments of the invention, examples of which are illustrated in the accompanying drawings.

Figure 1:
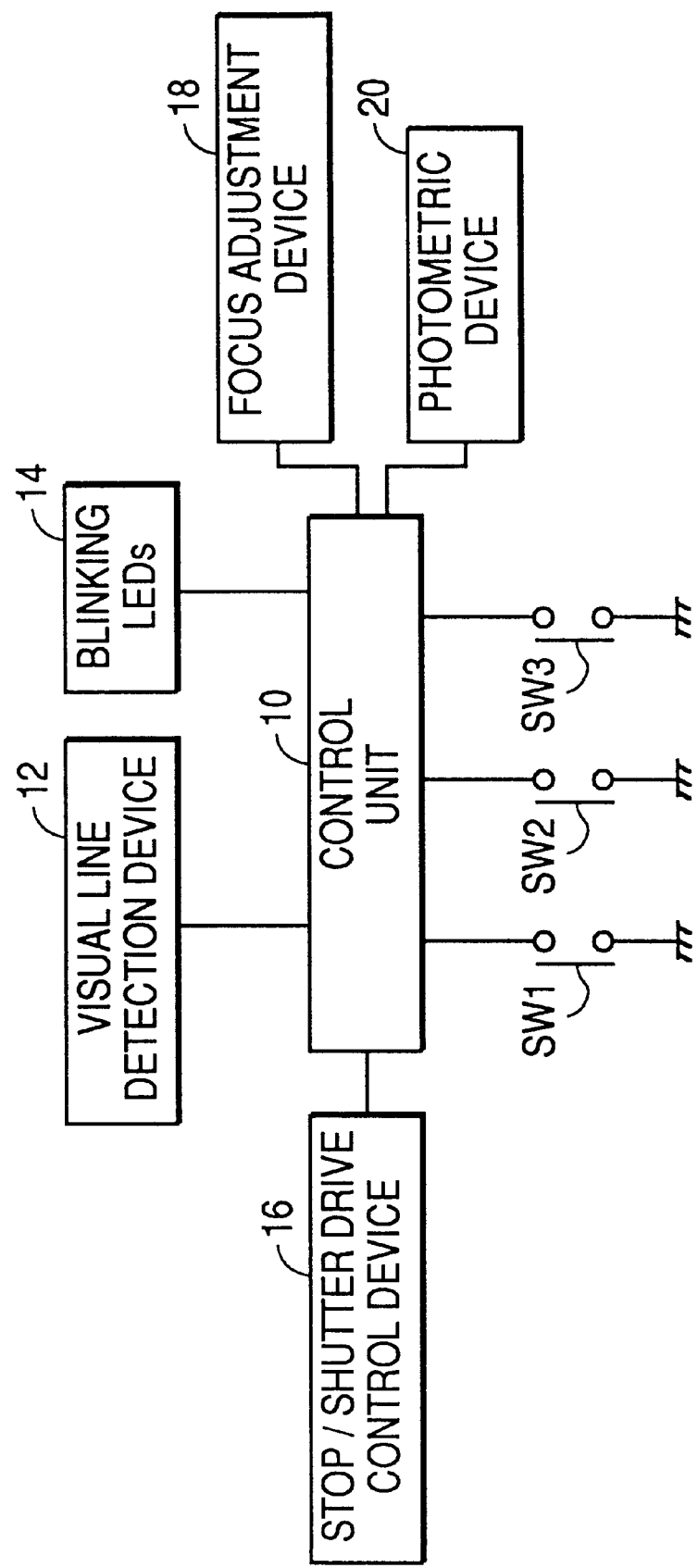
FIG. 1 is a block diagram of an electrical system of a camera having a visual line detection device in accordance with a preferred embodiment of the present invention.
Figure 2:
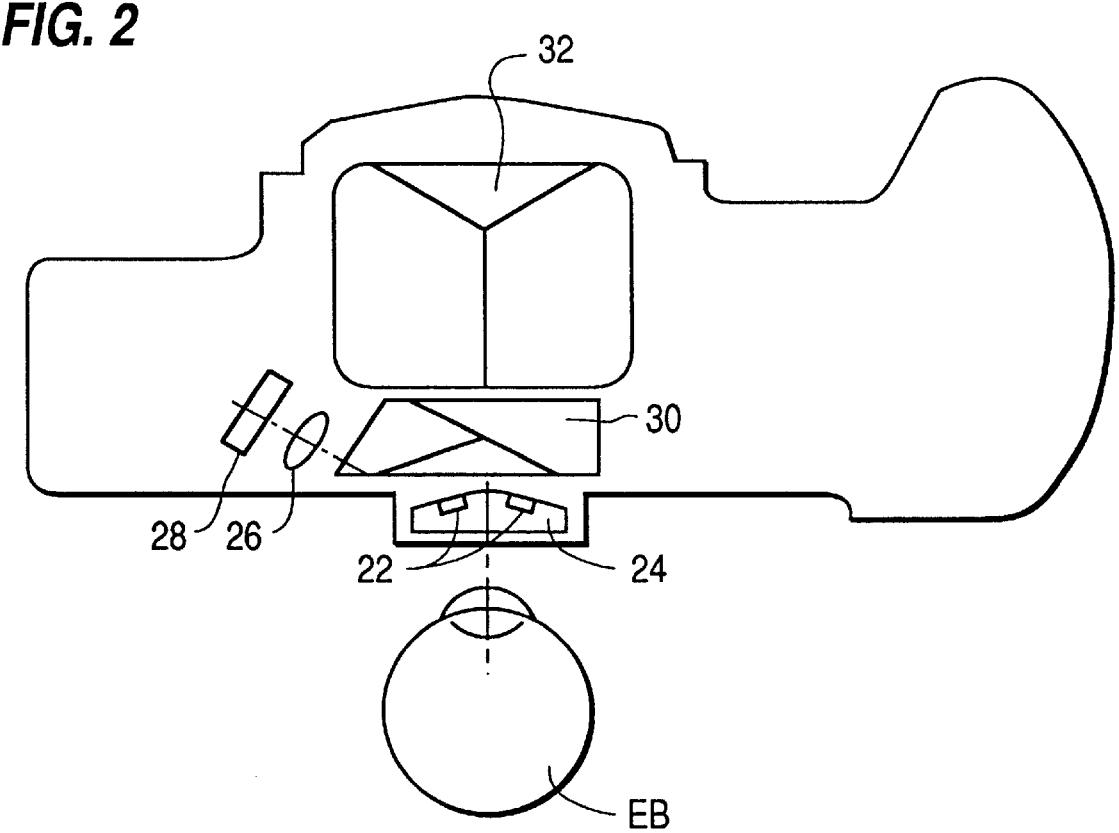
FIG. 2 is a schematic diagram of a visual line detection device which may be used in accordance with a preferred embodiment of the present invention.

FIG. 1 is a block diagram showing an electrical system of a camera having a visual line detection device in accordance with a preferred embodiment of the present invention. As embodied herein, a control unit 10 includes a CPU, a RAM and ROM as its main components. A well-known visual line detection device 12, which will be described in more detail below with respect to FIG. 2, is connected to control unit 10.

Figure 3:
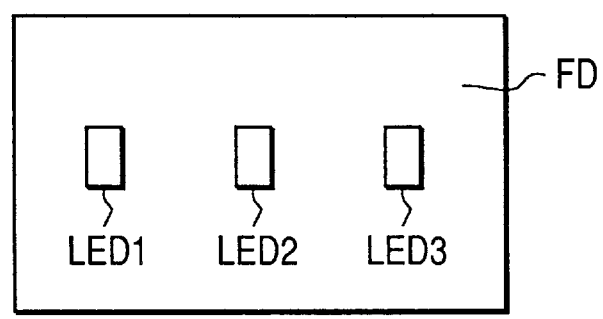
FIG. 3 is a diagram showing the disposition of light emitting diodes in a viewfinder in accordance with a preferred embodiment of the present invention.

A group of blinking light emitting diodes (LEDs) 14, which serve as reference marks to be observed by a photographer, are located in a viewfinder (not shown in the figure). As shown in FIG. 3, the LEDs may be arranged in the viewfinder FD, for example, wherein three LEDs ($LED_1$, $LED_2$, $LED_3$) are arranged in a row. Any one of these LEDs may be selectively illuminated under control of control unit 10. Each LED corresponds to a different segment within the viewfinder. Further, the number of LEDs is not limited to three and additional LEDs corresponding to additional segments may be used. The visual line detection device 12 and the blinking LED group 14 may be of the type disclosed in JP-A-1-274736.

The LEDs may also be located outside the viewfinder according to well known techniques. When the LEDs are located outside the viewfinder, a group of light reflecting portions receive light from each of the LEDs, respectively, and reflect light toward the eye of the photographer. Further, the LEDs may be substituted with passive display elements such as liquid crystal display elements. The liquid crystal display elements may be located in the viewfinder as is well known.

A group of three switches is connected to the control unit 10. SW1 is a power supply switch; SW2 is a switch which is set ON when a release button (not shown) is half depressed; and, SW3 is a switch which is set ON when the release button is fully depressed. A stop/shutter control device 16 is also provided for driving the stop and the shutter during photography. A focus adjustment device 18 performs focus detection in plural focus detection regions arranged in the subject field and, based upon these focus detections, drives a photographic lens (not shown) to a focused position. For example, the subject field may be divided into three segments corresponding to the plural focus detection regions. A photometric device 20, which may be a multi-segmented silicon photo diode (SPD) sensor or a CCD, measures the brightness of the subject field. The photometric device 20 also divides the subject field into plural measurement regions which correspond to the plural focus detection regions, and an exposure value is calculated by the control unit 10 based upon plural photometric values obtained for the respective plural measurement regions.

More specifically, a camera equipped with the system shown in FIG. 1 determines which focus detection region the photographer is scrutinizing from the information detected by the visual line detection device 12. Based upon the result of this determination, focus adjustment is performed by the focus adjustment device 18 so as to drive the photographic lens to focus on the subject in the region under scrutiny. Based upon the determined visual line, a weight is set for each photometric signal corresponding to a respective measurement region (e.g., the weight is large for the photometric measurement region through which the visual line passes). An exposure value is then calculated based upon the weight given photometric signals from respective regions.

Referring now to FIG. 2, a schematic top view of a well-known visual line detection device which may be employed in the preferred embodiment of the present invention is shown. A plurality of infrared light emitting diodes 22 illuminate the eyeball EB of a photographer as the photographer looks through an eyepiece lens 24. A condensing lens 26 images the whole eyeball EB on a CCD 28. A beam splitter 30 and a pentaprism 32 are also included in the visual line detection device.

Figure 4:
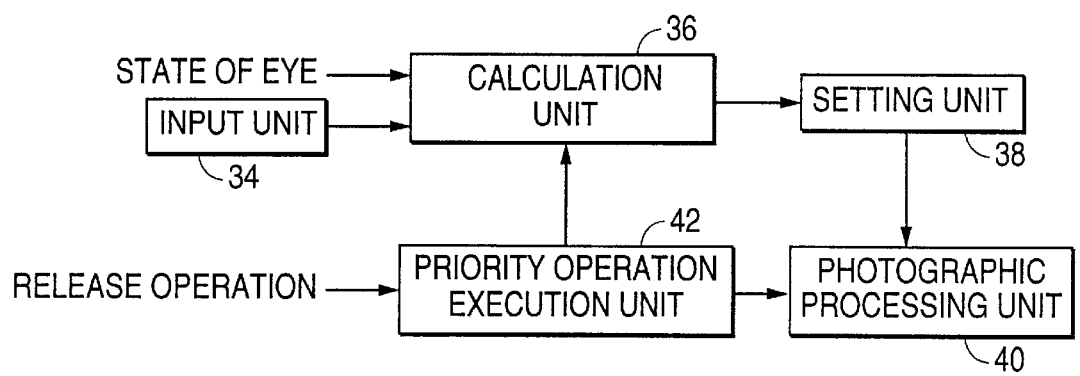
FIG. 4 is a block diagram of a system which assigns priority to photography when calibration information is input to a camera during visual line detection in accordance with a preferred embodiment of the present invention.

FIG. 4 is a block diagram of a system which assigns priority to photography when a release operation is performed during calibration information input in a camera having a visual line detection device. An input unit 34 inputs into the camera calibration information relating to the eye of a photographer. A calculation unit 36 calculates the visual line of the photographer based upon both the calibration information from the input unit 34 and the state of the photographer's eye. A setting unit 38 sets photographic conditions (e.g., focus and exposure control) based upon the calculated visual line, and a photographic processing unit 40 performs a photographic process under the photographic conditions set by the setting unit 38 in response to a release operation.

Further, a priority operation execution unit 42 suspends the input action of the input unit 34 when release operation is performed during the operation of input unit 34, thereby allowing photography to be performed even during the input of calibration information. The priority operation execution unit 42 also operates the photographic processing unit 40, such that after the input action is suspended a photographic process may be performed in response to a release operation.

Figure 5:
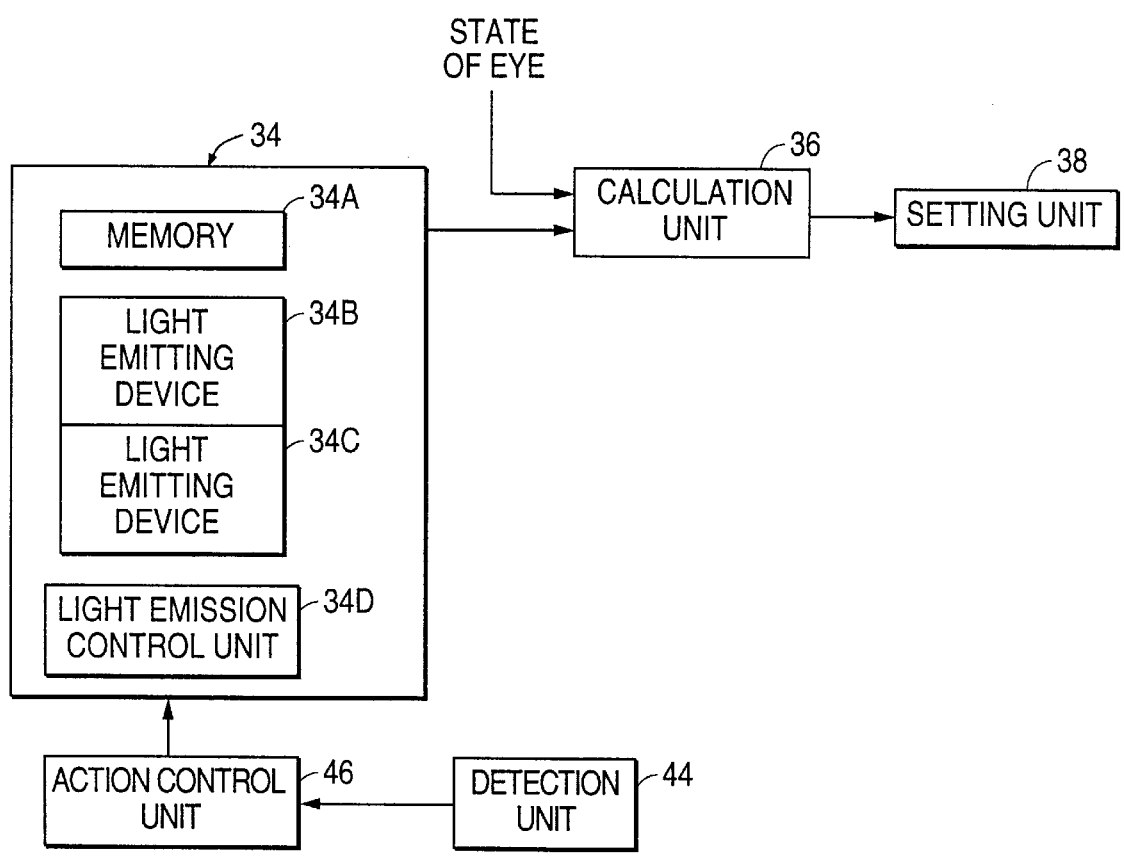
FIG. 5 is a block diagram of a system which automatically inputs calibration information in accordance with a preferred embodiment of the present invention.

FIG. 5 is a block diagram of a system for automatically inputting calibration information in accordance with a preferred embodiment of the present invention. Like elements in FIGS. 4 and 5 are referred to by like reference numerals and a description of these elements will not be repeated in detail here. A detection unit 44 detects that the photographer has contacted the eyepiece of the viewfinder. For example, a touch sensor may be arranged in the eyepiece contact portion of the viewfinder to detect eyepiece contact. An action control unit 46 causes the commencement of the action of the input unit 34 when eyepiece contact is detected by the detection unit 44.

The input unit 34 includes a memory 34A to store calibration information relating to one photographer, such that when eyepiece contact is detected by the detection unit 44, previously stored information values are overwritten by the calibration information obtained during the input action at the present time. The input unit 34 also includes light emitting devices 34B and 34C, which are preferably LEDs, to generate light at least two locations within the viewfinder. A light generation control unit 34D controls the light emitting device 34B to generate light at a first location within the viewfinder when eyepiece contact is detected, such that calibration information related to an operator scrutinizing the light emitting device 34B at the first location may be determined. When the input of calibration information for the light emitting device 34B ends, the light generation control unit 34D controls the light emitting device 34C to generate light at a second location within the viewfinder, such that calibration information relating to an operator scrutinizing the light emitting device 34C at the second location may be determined.

When eyepiece contact is detected by the detection unit 44, the input unit 34 commences the calibration information input action. However, when a release operation is performed during the input of calibration information by the input unit 34, photography is performed by the action of the photographic processing unit 40 due to the suspension of the input action of the input unit 34 by the priority operation execution unit 42. Further, whenever the input unit 34 inputs calibration information into the camera, previously stored calibration information is erased, and new calibration information is stored.

When the input unit 34 commences its action, the light emitting device 34B, which generates light at a first location within the viewfinder, is actuated. When the input of calibration information associated with a photographer scrutinizing the first light emitting device 34B comes to an end, the light emitting device 34C, which generates light at a second location within the viewfinder is actuated, and calibration information associated with a photographer scrutinizing the second light emitting device 34C is input.

Figure 6:
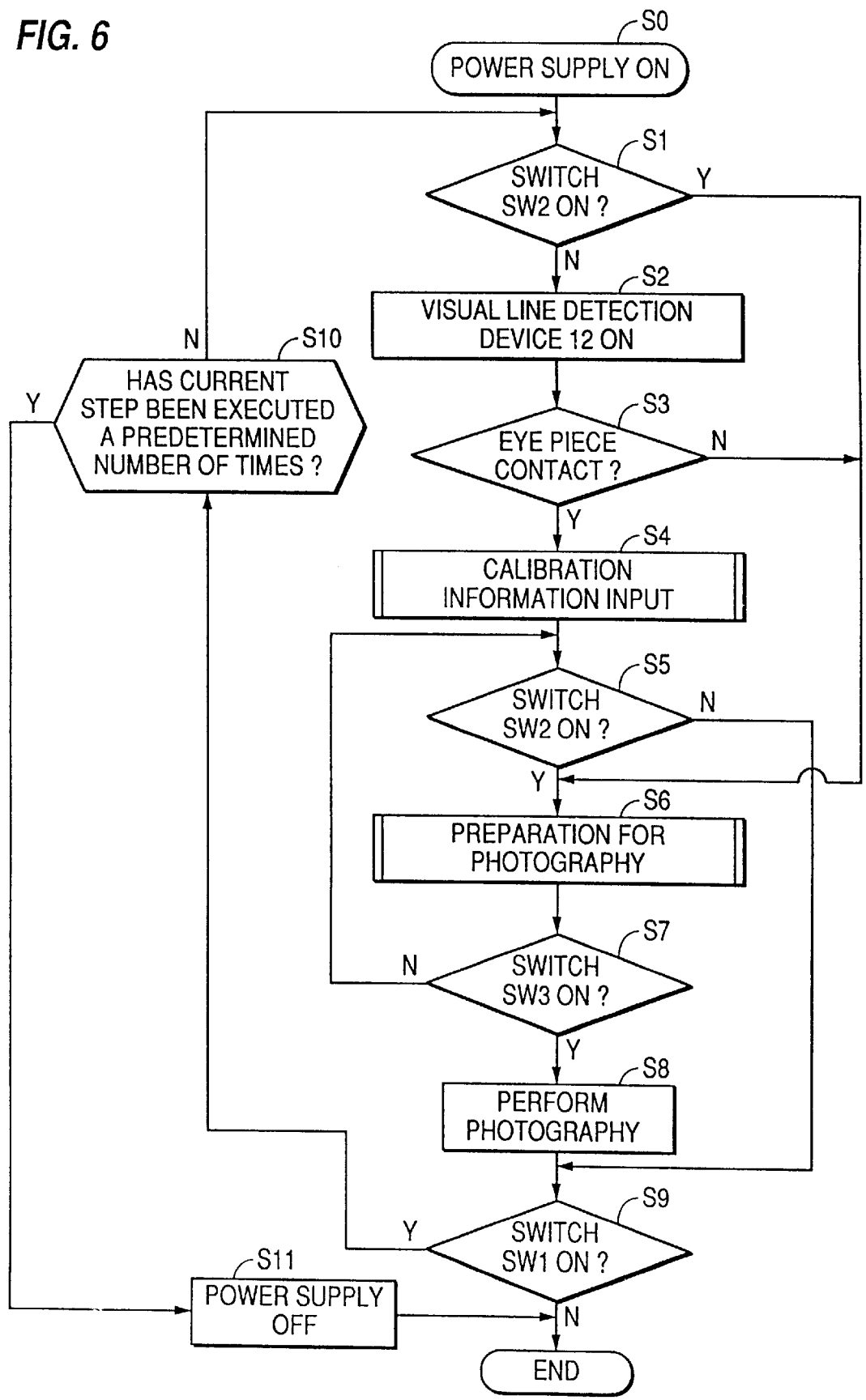
FIG. 6 is a flow chart showing an example of a method for controlling a camera in accordance with a preferred embodiment of the present invention.

FIG. 6 is a flow chart showing an example of a method for controlling a camera in accordance with a preferred embodiment of the present invention. Execution of the control routine begins in step S0 when the power supply switch SW1 is set ON. In step S1, it is determined whether the switch SW2 is set ON, indicating that the release button is half-depressed. If switch SW2 is ON, steps S2–S5 are skipped and the program proceeds directly to step S6. If it is determined that switch SW2 is not ON, the program proceeds to step S2, where the visual line detection device 12 is set ON. Next, in step S3, it is determined whether the photographer is looking into the viewfinder by determining whether there is eyepiece contact. A touch sensor arranged in the eyepiece contact portion detects eyepiece contact. Further, the output from the CCD 28 arranged in the visual line detection device 12 (FIG. 2) is used to determine whether the photographer is looking into the viewfinder at this time.

Figure 7:
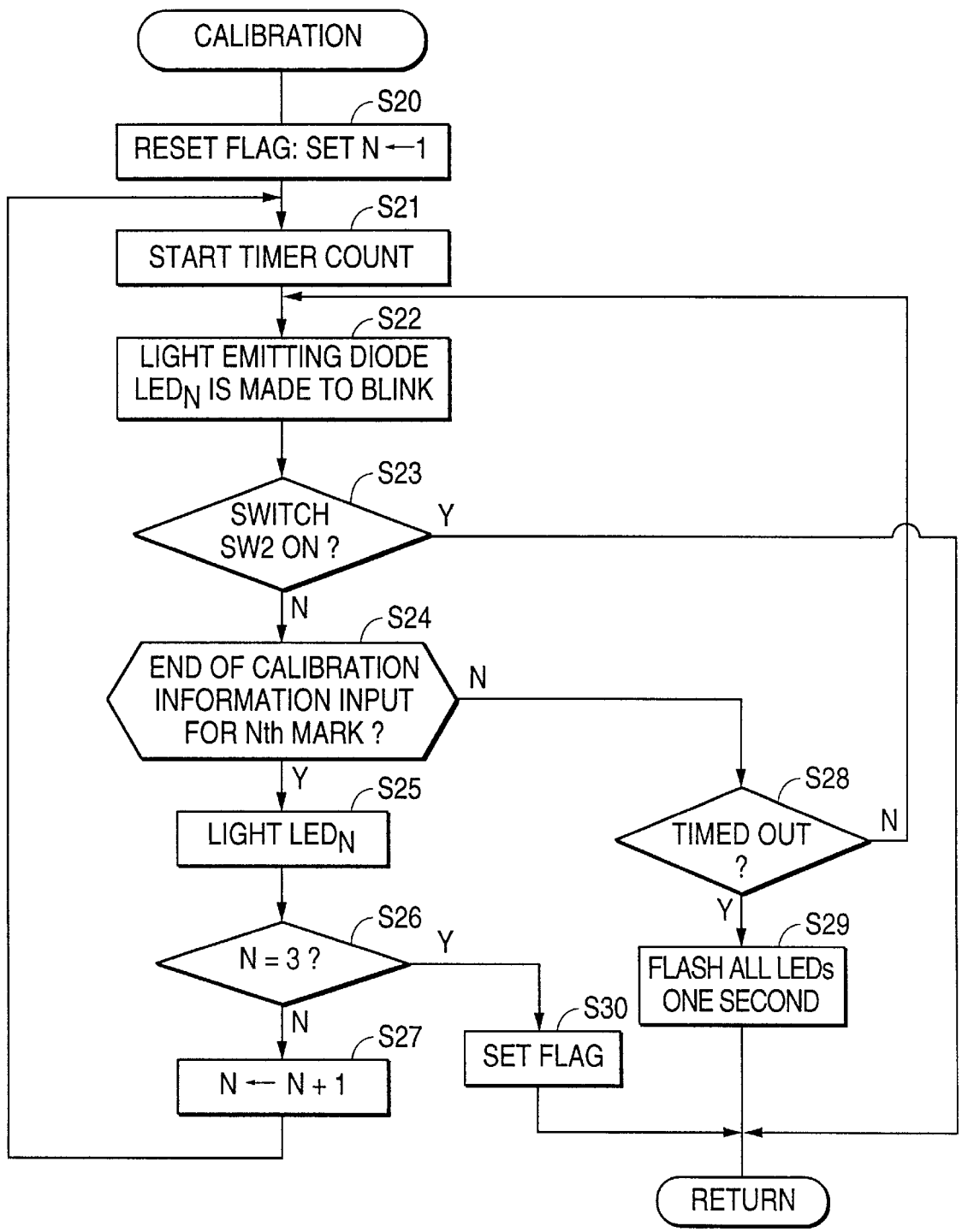
FIG. 7 is a flow chart showing an example of a method for inputting calibration information into a camera in accordance with a preferred embodiment of the present invention.

When eyepiece contact has been detected in step S3, the program proceeds to step S4, and calibration information input is performed, as shown in the flowchart of FIG. 7, which will be described in detail later. In step S5, it is determined whether the half-depression switch SW2 is ON.

When switch SW2 is ON, the program proceeds to step S6, and the processes in preparation for photography are performed, as will be described in detail later with reference to the flowcharts of FIGS. 8 and 9.

Continuing, in step S7, it is determined whether the full-depression switch SW3 is ON, indicating that the release button is fully depressed. When the full-depression switch SW3 is detected ON in step S7, the program proceeds to step S8, and photography is performed under the conditions set in step S6, and further actions are performed to prepare for the next photograph. Specifically, with silver salt film, the film is wound one frame. However, when it has been determined in step S5 that the half-depression switch SW2 is OFF, steps S6–S8 are skipped and the program proceeds directly to step S9. In step S9, it is determined whether or not the power supply switch SW1 is ON. When it is determined that the power supply switch SW1 is ON, the program proceeds to step S10 where it is determined whether step S10 has been executed a predetermined number of times. When step S10 is affirmative, the routine ends in step S11 when the power supply is turned OFF. Step S11 performs an automatic shut-off feature whereby the power is automatically shut off to save energy. However, until it is determined (in step S10) that step S10 has been executed the predetermined number of times, the program returns to step S1, and step S1 through step S9 are repeated. When it is determined in step S9 that the power supply switch SW1 is OFF, the control routine ends.

Referring now to FIG. 7, a flow chart illustrating a procedure for inputting calibration information, corresponding to step S4 of FIG. 6, is shown. Beginning in step S20, a flag is reset and a variable N is set to 1. As will be described below, the flag indicates that the input of calibration information has ended when the flag is set. The variable N corresponds to a particular light emitting diode $LED_N$ which is used as an Nth reference mark which is scrutinized by a camera operator in order to determine calibration input information. Next, in step S21, a time count is started. In step S22, the Nth light emitting diode $LED_N$, which serves as the Nth reference mark, is made to blink. Proceeding to step S23, it is determined whether or not the half-depression switch SW2 is set ON. If the determination in step S23 is affirmative, the program returns to step S5 of FIG. 6.

However, when it has been determined in step S23 that the half-depression switch SW2 is OFF, the program proceeds to step S24, where it is determined whether the input of calibration information corresponding to an Nth reference mark has ended. When step S24 is affirmative, in step S25 the light emitting diode $LED_N$ is made to light up for a period of time, e.g., one second, indicating the end of the calibration input for the current reference mark. Further, after the last light emitting diode $LED_3$ is made to light up for about one second, it is extinguished and all the light emitting diodes are extinguished. Accordingly, due to the extinction of all the light emitting diodes, the photographer can recognize the end of the input of calibration information. In step S26, it is determined whether or not the variable N is 3. Specifically, according to this example, the number of LEDs used as reference marks is three. Therefore, in step S26, it is determined whether the input of calibration information for all the LEDs has ended. The program then proceeds to step S30 where the flag which was reset in step S20 is set, and the calibration routine returns to step S5 of FIG. 6. The flag set in step S30 as described in detail later with respect to the FIG. 9, indicates that the input of calibration information has ended. However, if the determination in step S26 is negative, the program proceeds to step S27 where the variable N is increased by 1 and the program returns to step S21. The calibration process is then carried out again in a similar manner for the next (N+1)th reference mark.

In step S24, when it has been detected that the input of calibration information corresponding to the Nth reference mark has not ended, the program proceeds to step S28, and it is determined whether the timer count has reached a predetermined value (i.e., whether the timer has timed out). When the timer has not timed out, the program returns to step S22 and the light emitting diode $LED_N$ continues to blink. When the timer has timed out, the routine proceeds to step S29, and all the LEDs are made to flash for one second, indicating that an error has occurred in the input of calibration information for use in visual line detection. The photographer may then try again to input calibration information. The control routine then returns to step S5 of FIG. 6.

Figure 8:
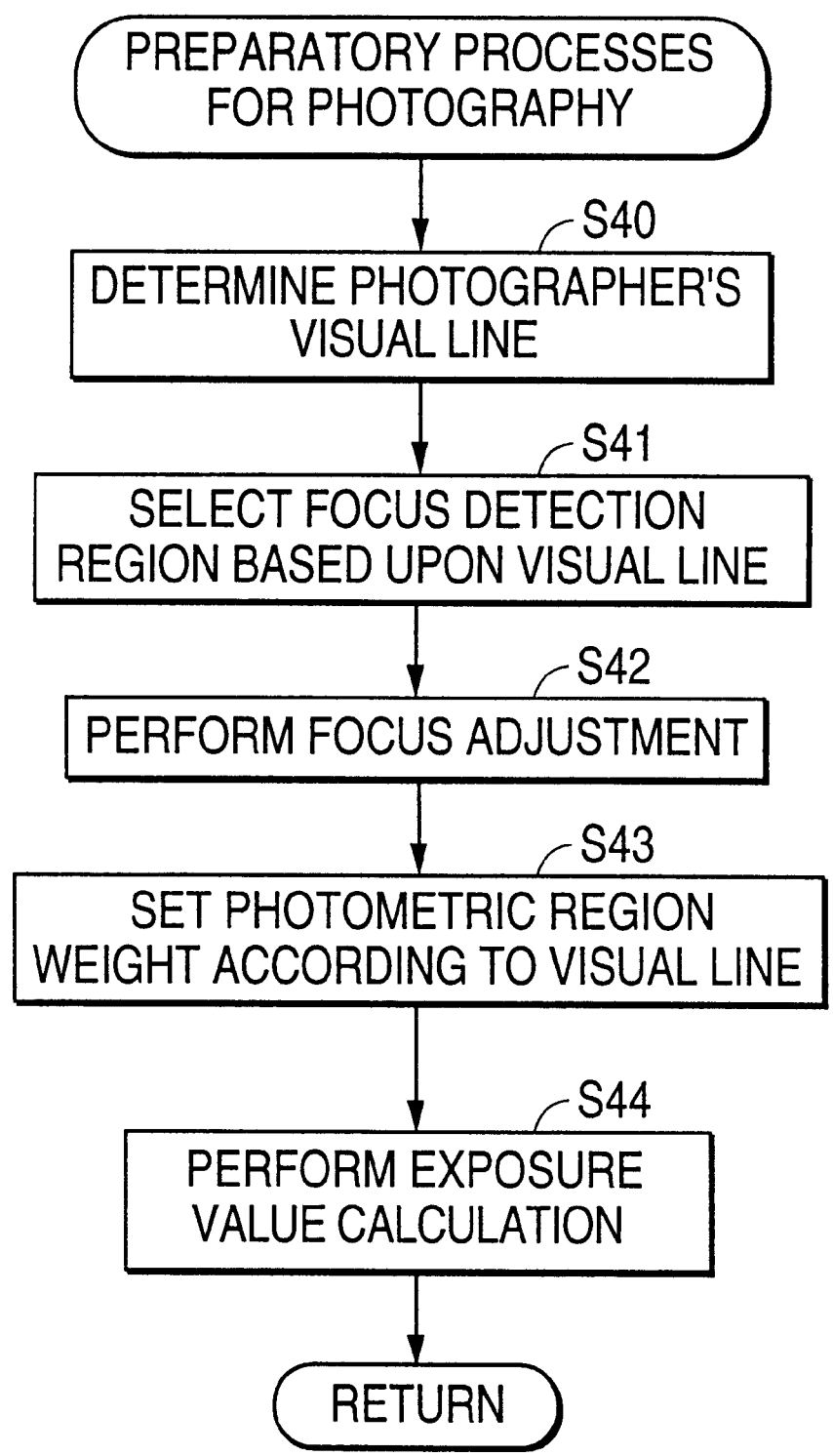
FIG. 8 is a flow chart showing an example of a photographic preparation process sequence in a camera in accordance with a preferred embodiment of the present invention.

FIG. 8 is a flow chart showing in detail an example of the processes preparatory to photography performed in step S6 of FIG. 6. In step S40, a visual line detection signal is received from the visual line detection device 12, and the photographer's visual line is calculated according to a known method, a detailed description of which will be omitted. Next, in step S41, a focus detection region is selected, based upon the determined visual line, and the calculations for focus adjustment are performed. In step S42, the photographic lens is driven to a focused position. For example, the photographic lens is driven to a focused position based on the focus detection result corresponding to the region through which the visual line passes. Proceeding to step S43, based on the determined visual line, at the time of photometric calculation by photometric device 20, a weight is set for each sectional photometric signal. For example the weight is large for the sectional photometric signal from the region through which the visual line passes, and the weight is small for the sectional photometric signals from the other regions. Finally, in step S44, based upon the weight, an exposure value calculation is performed. After the exposure value is calculated, the program returns to step S7 of FIG. 6.

Thus, the present invention prevents an operator from missing a chance for taking a photograph by giving shutter action priority when the release button is fully depressed during the action of the input of calibration information.

Furthermore, when the photographer does not operate the release button after the power supply is turned ON, but looks into the viewfinder, the action of input of calibration information automatically begins, and the first light emitting diode $LED_1$ in the viewfinder blinks for a predetermined time. When the photographer scrutinizes the blinking light emitting diode $LED_1$ during the predetermined time, calibration information for the first light emitting diode $LED_1$ is recorded. After this, the second light emitting diode $LED_2$ blinks. Similarly, the photographer scrutinizes this light emitting diode $LED_2$, and the calibration information for the second light emitting diode LED2 is stored. Similarly, the calibration information for the third light emitting diode $LED_3$ is stored. Calibration information for the photographer's eye is then calculated, based on the three stored values, and the calibration information is stored in an EEPROM of the control unit 10 or in a power supply type backup ROM. When calibration information has previously been recorded, it is overwritten by the new calibration information.

Accordingly, after the closing of the power supply switch SW1, the light emitting diodes $LED_1$–$LED_3$ which blink in succession are scrutinized in succession in the viewfinder, and the calibration information relating to the photographer's eye is input automatically. Further, the calibration information is overwritten whenever the eyepiece is contacted. Therefore, after the power supply has been switched ON, by automatically effecting the input of calibration data for the present photographer and overwriting previously stored calibration data, specific identification numbers and corresponding memory addresses do not have to be assigned to plural photographers using the camera. Further, it is not necessary to read out the data corresponding to plural photographers, which is a complicated operation.

Although the preferred embodiment of the present invention has been described such that each respective LED lights up for one second to indicate that the input of calibration information has ended for a particular LED, the invention is not limited to such an indication. For example, the light emitting diodes may be such that they light up continuously when the input of calibration information has ended. Therefore, each of the LEDs remain lighted after blinking, and all the light emitting diodes are lighted at the point in time when the input of all the calibration information has ended. Then the LEDs remain lighted e.g., for one second after the third LED has stopped blinking, thus indicating that the calibration information has been input for all the reference marks.

Further, when the half-depression operation is performed before the input of calibration information has ended, specifically, before the calibration information has been overwritten, the calibration information which has been stored is used as the calibration information for the visual line calculation.

However, the calibration information used when the half-depression operation is performed before the previously stored calibration information is overwritten is not limited to the above described information, and any of the following types of calibration information may also be used.

(1) The average value of plural items of calibration information stored previously may be used.

A second storage (for example, EEPROM) is arranged, and the average value of the most recent m items of calibration information and the number m are stored in the second storage. Then, when the latest calibration information is recorded in the first storage (i.e., the EEPROM or power source backup type RAM, etc.), the control unit 10 adds the value of the latest information to the average value of the m items of calibration information and divides the sum by m+1. The result obtained is stored by overwriting in the second storage.

(2) The most frequently recorded calibration information among plural items of calibration information recorded previously may be used.

The frequency distribution of calibration information is calculated, for example, in the control unit 10 by dividing the range of the detected calibration information (already known) into plural divisions (e.g., 100 divisions), and allotting memory sections to each of these divisions. When calibration information is detected, corresponding to a respective division within the range, it is added to the stored value in the memory section allotted to this division. Then, when the half depression operation is performed, the calibration information corresponding to the greatest stored value, specifically, the information with the highest generated frequency, is adopted and used for the visual line calculation.

(3) Standard calibration information already stored in the camera may be used.

ROM with the standard calibration information recorded in it is arranged in the control unit 10, and when the half depression operation is performed and the calibration information has not been updated, the readout from the ROM is used. The standard calibration information is obtained by previously collecting the calibration information for plural persons.

Figure 9:
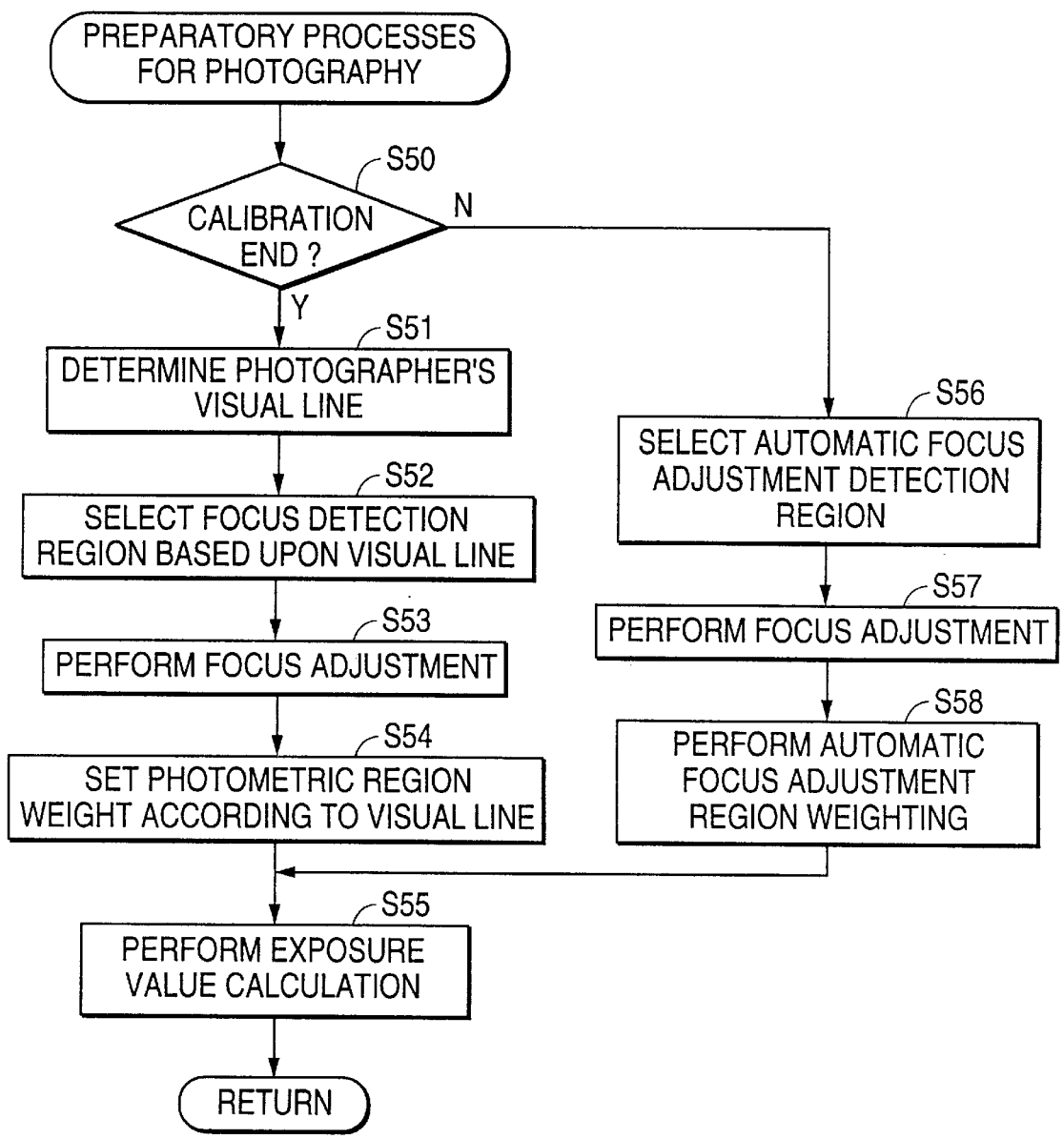
FIG. 9 is a flow chart showing a second example of a photographic preparation process sequence in a camera in accordance with a preferred embodiment of the present invention.

FIG. 9 is a flow chart showing a second example of a method for performing photographic preparation processes according to a preferred embodiment of the present invention. Certain steps shown in FIG. 9 are the same as steps performed in the preparatory process shown in FIG. 8, and therefore, the differences from FIG. 8 will be described in more detail.

According to the example shown in FIG. 9, when the half depression operation is performed while the input of calibration information is still occurring (i.e., before the input of calibration information has ended), signals from the visual line detection device 12 are not used, and the focus adjustment and exposure value calculation are performed according to well known methods.

In step S50, it is determined from the state of the flag set in step S30 of FIG. 7 whether the input of calibration information has ended. When the flag is set, it is determined that the input of calibration information has ended, as described in steps S40–S44 of FIG. 8, the focus adjustment and exposure value calculation are performed based on the signals from the visual line detection device 12 in steps S51–S55. When the flag is reset, it is determined that the input of calibration information has not ended, control proceeds to step S56, and the camera performs automatic focus adjustment according to well known methods without using the visual line detection device 12. For example, focus detection signals are selected from the region corresponding to the closest subject among plural focus detection results, and in step S57 focus adjustment is performed by driving the photographic lens into a focused position. Furthermore, in step S58, among plural sectional photometric signals, the weight assigned the photometric signals from the photometric region corresponding to the closest region used in focus adjustment is made large.

The above-described invention is applicable to not only cameras with silver salt films but also video cameras including movie cameras and still cameras.

Although a few preferred embodiments of the present invention have been shown and described it will be appreciated by those skilled in the art that changes may be made in these embodiments without departing from the principles and spirit of the invention, the scope of which is defined in the appended claims and their equivalents.

What is claimed is:

1. A camera having a visual line detection device, comprising:
    an input unit to input calibration information related to an eye of a photographer;
    a calculation unit to calculate a visual line of the photographer based upon the calibration information and a state of the eye of the photographer;
    a setting unit to set photographic conditions based upon the calculated visual line;
    a photographic unit to execute photographic processes in response to a release operation; and
    a priority operation execution unit to actuate the photographic unit when a release operation is performed during input of calibration information.

2. The camera as recited in claim 1, wherein the priority operation execution unit suspends the input action of the input unit when the release operation is performed during the input of the calibration information.

3. The camera having a visual line detection device, as recited in claim 2, further comprising:
    a viewfinder having an eyepiece;
    a detection unit to detect eyepiece contact with the viewfinder by the photographer; and
    an action control unit to begin the input of calibration information when eyepiece contact is detected by the detection unit.

4. The camera having a visual line detection device, as recited in claim 3, wherein the input unit further comprises:
    a memory unit to store calibration information for one operator, such that, when eyepiece contact is detected by the detection unit, previously stored information values are overwritten by calibration information obtained by the input action at the present time.

5. The camera having a visual line detection device, as recited in claim 3, wherein the input unit further comprises:
    a display unit to display at least two marks to be observed by a photographer at different locations in the viewfinder; and
    a display control unit to control the display unit to display a first mark at a first location when the eyepiece contact is detected, and to control the display unit to display a second mark at a second location when the first mark display ends.

6. The camera having a visual line detection device, as recited in claim 5, wherein the at least two marks are produced by LEDs.

7. A device to input calibration information to a camera, comprising:
    an input unit to input calibration information to the camera related to an eye of a photographer;
    a photographic unit to execute photographic processes in response to a release operation; and
    a priority operation execution unit to actuate the photographic unit when a release operation is performed during input of calibration information.

8. The device as recited in claim 7, wherein the priority operation execution unit suspends the input action of the input unit when the release operation is performed during the input of the calibration information.

9. A device which inputs calibration information into a camera, comprising:
    an input unit to input calibration information related to an eye of a photographer; and
    a priority operation execution unit to suspend the input action of the input unit when a release operation is performed during input of calibration information.

10. The device as recited in claim 9, wherein the input unit comprises:
    a viewfinder;
    a display unit to display at least two marks to be observed by a photographer at different locations in the viewfinder; and
    a display control unit to control the display unit to display a first mark at a first location, and to control the display unit to display a second mark at a second location when the first mark display ends,
    wherein the at least two marks are produced by LEDs.

11. The device as recited in claim 7, further comprising:
a viewfinder having an eyepiece;
a detection unit to detect a photographer looking into the viewfinder; and
an action control unit to automatically begin the input of calibration information when the detection unit detects the photographer looking into the viewfinder.

12. The device as recited in claim 7, wherein the input unit comprises a memory to store calibration information for one photographer, and previously stored calibration information is overwritten in the memory and replaced with calibration information corresponding to a present photographer.

13. The device as recited in claim 7, wherein the input unit comprises at least two light emitting devices which are scrutinized by the photographer such that calibration information may be entered.

14. The device as recited in claim 9, further comprising:
a memory to store predetermined calibration information; and
a calculation unit to calculate a visual line of the photographer based on the input calibration information when the input action of the input unit is not suspended, and to calculate a visual line of the photographer based on the predetermined calibration information when the input action of the input unit is suspended.

15. The device as recited in claim 9, wherein the input unit comprises:
a viewfinder; and
a detection unit to detect a photographer looking into the viewfinder, wherein the input of calibration information automatically begins when the detection unit detects the photographer looking into the viewfinder.

16. A device, comprising:
an input unit to input calibration information related to an eye of an operator;
a calculation unit connected to the input unit to calculate a visual line of the operator based upon the calibration information and a state of the eye of the operator;
a setting unit connected to the calculation unit to set conditions based upon the calculated visual line;
a unit connected to the setting unit to execute processes in response to an operation; and
a priority operation execution unit connected to the unit to actuate the unit when the operation is performed during input of calibration information.

17. The device as recited in claim 16, wherein the priority operation execution unit suspends the input action of the input unit when the operation is performed during the input of the calibration information.

18. The device, as recited in claim 17, further comprising:
a viewfinder having an eyepiece;
a detection unit connected to the viewfinder to detect eyepiece contact with the viewfinder by the operator; and
an action control unit connected to the detection unit to begin the input of calibration information when eyepiece contact is detected by the detection unit.

19. The device, as recited in claim 18, wherein the input unit further comprises:
a memory unit to store calibration information for one operator, such that, when eyepiece contact is detected by the detection unit, previously stored information values are overwritten by calibration information obtained by the input action at the present time.

20. The device, as recited in claim 18, wherein the input unit further comprises:
a display unit to display at least two marks to be observed by an operator at different locations in the viewfinder; and
a display control unit to control the display unit to display a first mark at a first location when the eyepiece contact is detected, and to control the display unit to display a second mark at a second location when the first mark display ends.

21. The device, as recited in claim 20, wherein the at least two marks are produced by LEDs.

22. A device to input calibration information, comprising:
an input unit to input calibration information related to an eye of an operator;
a unit to execute a process in response to an operation; and
a priority operation execution unit connected to the unit and to the input unit to actuate the unit when the operation is performed during input of calibration information.

23. The device as recited in claim 22, wherein the priority operation execution unit suspends the input action of the input unit when the operation is performed during the input of the calibration information.

24. A device which inputs calibration information, comprising:
an input unit to input calibration information related to an eye of an operator; and
a priority operation execution unit connected to the input unit to suspend the input action of the input unit when an operation is performed during input of calibration information.

25. The device as recited in claim 24, wherein the input unit comprises:
a viewfinder;
a display unit to display at least two marks to be observed by an operator at different locations in the viewfinder; and
a display control unit to control the display unit to display a first mark at a first location, and to control the display unit to display a second mark at a second location when the first mark display ends,
wherein the at least two marks are produced by LEDs.

26. The device as recited in claim 22, further comprising:
a viewfinder having an eyepiece;
a detection unit connected to the viewfinder to detect an operator looking into the viewfinder; and
an action control unit connected to the detection unit to automatically begin the input of calibration information when the detection unit detects the operator looking into the viewfinder.

27. The device as recited in claim 22, wherein the input unit comprises a memory to store calibration information for one operator, and previously stored calibration information is overwritten in the memory and replaced with calibration information corresponding to a present operator.

28. The device as recited in claim 22, wherein the input unit comprises at least two light emitting devices which are scrutinized by the operator such that calibration information may be entered.

29. The device as recited in claim 24, further comprising:
a memory to store predetermined calibration information; and
a calculation unit connected to the memory to calculate a visual line of the operator based on the input calibration information when the input action of the input unit is not suspended, and to calculate a visual line of the operator based on the predetermined calibration information when the input action of the input unit is suspended.

30. The device as recited in claim 24, wherein the input unit comprises:
   a viewfinder; and
   a detection unit to detect an operator looking into the viewfinder, wherein the input of calibration information automatically begins when the detection unit connected to the imaging unit detects the operator looking into the viewfinder.

31. An imaging device, comprising:
   an input unit to input calibration information related to an eye of an operator;
   a calculation unit connected to the input unit to calculate a visual line of the operator based upon the calibration information and a state of the eye of the operator;
   a setting unit connected to the calculation unit to set imaging conditions based upon the calculated visual line;
   an imaging unit connected to the setting unit to execute imaging processes in response to an operation; and
   a priority operation execution unit connected to the imaging unit to actuate the imaging unit when the operation is performed during input of calibration information.

32. The imaging device as recited in claim 31, wherein the priority operation execution unit suspends the input action of the input unit when the operation is performed during the input of the calibration information.

33. The imaging device, as recited in claim 32, further comprising:
   a viewfinder having an eyepiece;
   a detection unit connected to the viewfinder to detect eyepiece contact with the viewfinder by the operator; and
   an action control unit connected to the detection unit to begin the input of calibration information when eyepiece contact is detected by the detection unit.

34. The imaging device, as recited in claim 33, wherein the input unit further comprises:
   a memory unit to store calibration information for one operator, such that, when eyepiece contact is detected by the detection unit, previously stored information values are overwritten by calibration information obtained by the input action at the present time.

35. The imaging device, as recited in claim 33, wherein the input unit further comprises:
   a display unit to display at least two marks to be observed by an operator at different locations in the viewfinder; and
   a display control unit to control the display unit to display a first mark at a first location when the eyepiece contact is detected, and to control the display unit to display a second mark at a second location when the first mark display ends.

36. The imaging device, as recited in claim 35, wherein the at least two marks are produced by LEDs.

37. A device to input calibration information to an imaging device, comprising:
   an input unit to input calibration information to the imaging device related to an eye of an operator;
   an imaging unit to execute imaging processes in response to an operation; and
   a priority operation execution unit connected to the imaging unit and to the input unit to actuate the imaging unit when the operation is performed during input of calibration information.

38. A device as recited in claim 37, wherein the priority operation execution unit suspends the input action of the input unit when the operation is performed during the input of the calibration information.

39. A device to input calibration information into an imaging device, comprising:
   an input unit to input calibration information related to an eye of an operator; and
   a priority operation execution unit connected to the input unit to suspend the input action of the input unit when an operation is performed during input of calibration information.

40. A device as recited in claim 39, wherein the input unit comprises:
   a viewfinder;
   a display unit to display at least two marks to be observed by an operator at different locations in the viewfinder; and
   a display control unit to control the display unit to display a first mark at a first location, and to control the display unit to display a second mark at a second location when the first mark display ends,
   wherein the at least two marks are produced by LEDs.

41. A device as recited in claim 37, further comprising:
   a viewfinder having an eyepiece;
   a detection unit connected to the viewfinder to detect an operator looking into the viewfinder; and
   an action control unit connected to the detection unit to automatically begin the input of calibration information when the detection unit detects the operator looking into the viewfinder.

42. A device as recited in claim 37, wherein the input unit comprises a memory to store calibration information for one operator, and previously stored calibration information is overwritten in the memory and replaced with calibration information corresponding to a present operator.

43. The device as recited in claim 37, wherein the input unit comprises at least two light emitting devices which are scrutinized by the operator such that calibration information may be entered.

44. The device as recited in claim 39, further comprising:
   a memory to store predetermined calibration information; and
   a calculation unit connected to the memory to calculate a visual line of the operator based on the input calibration information when the input action of the input unit is not suspended, and to calculate a visual line of the operator based on the predetermined calibration information when the input action of the input unit is suspended.

45. The device as recited in claim 39, wherein the input unit comprises:
   a viewfinder; and
   a detection unit to detect an operator looking into the viewfinder, wherein the input of calibration information automatically begins when the detection unit detects the operator looking into the viewfinder.

46. An imaging device as recited in claim 31, wherein the imaging device is a video camera.

47. An imaging device as recited in claim 31, wherein the imaging device is a digital still camera.

48. A device as recited in claim 37, wherein the imaging device is a video camera.

49. A device as recited in claim 37, wherein the imaging device is a digital still camera.

50. A device as recited in claim 39, wherein the imaging device is a video camera.

51. A device as recited in claim 39, wherein the imaging device is a digital still camera.

52. A method of operating a camera, comprising the steps of:

inputting calibration information related to an eye of a photographer;

calculating a visual line of the photographer based upon the calibration information and a state of the eye of the photographer;

setting photographic conditions based upon the calculated visual line;

executing photographic processes in response to a release operation; and actuating the photographic processes when a release operation is performed during the step of inputting the calibration information.

53. A method of inputting calibration information to a camera, comprising the steps of:

inputting calibration information related to an eye of a photographer;

executing photographic processes in response to a release operation; and actuating the photographic processes when the release operation is performed during input of the calibration information.

54. A method of inputting calibration information into a camera, comprising the steps of:

inputting calibration information related to an eye of a photographer; and suspending the input action of the calibration information when a release operation is performed during input of the calibration information.

55. A method of operating an imaging device, comprising the steps of:

inputting calibration information related to an eye of an operator;

calculating a visual line of the operator based upon the calibration information and a state of the eye of the operator;

setting imaging conditions based upon the calculated visual line;

executing imaging processes in response to an initiation operation; and actuating the imaging processes when the initiation operation is performed during the step of inputting the calibration information.

56. A method of inputting calibration information to an imaging device, comprising the steps of:

inputting calibration information related to an eye of an operator;

executing imaging processes in response to an initiation operation; and actuating the imaging processes when the initiation operation is performed during input of the calibration information.

57. A method of inputting calibration information to an imaging device, comprising the steps of:

inputting calibration information related to an eye of an operator; and suspending the input action of the calibration information when an imaging operation is performed during input of the calibration information.

58. A camera having a visual line detection device, comprising:

means for inputting calibration information related to an eye of a photographer;

means for calculating a visual line of the photographer based upon the calibration information and a state of the eye of the photographer;

means for setting photographic conditions based upon the calculated visual line;

means for executing photographic processes in response to a release operation; and means for actuating the photographic unit when a release operation is performed during input of calibration information.

59. A device to input calibration information to a camera, comprising:

means for inputting calibration information to the camera related to an eye of a photographer;

means for executing photographic processes in response to a release operation; and means for actuating the photographic unit when a release operation is performed during input of calibration information.

60. A device which inputs calibration information into a camera, comprising:

means for inputting calibration information related to an eye of a photographer; and means for suspending the input action of the input unit when a release operation is performed during input of calibration information.

61. A device, comprising:

means for inputting calibration information related to an eye of an operator;

means for calculating a visual line of the operator based upon the calibration information and a state of the eye of the operator;

means for setting conditions based upon the calculated visual line;

means for executing processes in response to an operation; and means for actuating the means for executing when the operation is performed during input of calibration information.

62. A device to input calibration information, comprising:

means for inputting calibration information related to an eye of an operator;

means for executing a process in response to an operation; and means for actuating the means for executing when the operation is performed during input of calibration information.

63. A device which inputs calibration information, comprising:

means for inputting calibration information related to an eye of an operator; and means for suspending the input action of the means for inputting when an operation is performed during input of calibration information.

64. An imaging device, comprising:

means for inputting calibration information related to an eye of an operator;

means for calculating a visual line of the operator based upon the calibration information and a state of the eye of the operator;

means for setting imaging conditions based upon the calculated visual line;

means for executing imaging processes in response to an operation; and means for actuating the means for executing when the operation is performed during input of calibration information.

65. A device to input calibration information to an imaging device, comprising:

means for inputting calibration information to the imaging device related to an eye of an operator;

means for executing imaging processes in response to an operation; and means for actuating the means for executing when the operation is performed during input of calibration information.

66. A device to input calibration information into an imaging device, comprising:

means for inputting calibration information related to an eye of an operator; and means for suspending the input action of the means for inputting when an operation is performed during input of calibration information.

67. An imaging device, comprising:

a photometric device to measure plural photometric values of a subject field in plural measurement areas;

a focus adjustment device to perform focus adjustment based on focus detection results in a plurality of focus detection regions corresponding to the plural measurement areas of the subject field;

a visual line detection device to detect a visual line of an operator and to determine a focus detection region which the operator is scrutinizing based on the detected visual line;

a control unit to assign a weight to each photometric value corresponding to a respective measurement area according to the detected visual line, to calculate an exposure value based on the weighted plural photometric values obtained for the plural measurement areas, and to control focus adjustment by the focus adjustment device to focus on a subject in the region under scrutiny;

a calibration information input device to input calibration information related to an eye of an operator;

an initiation device to initiate an imaging operation; and a priority operation execution unit to suspend the input of calibration information by the calibration information input device when the initiation device initiates an imaging operation during the input of calibration information, wherein the visual line detection device determines a visual line of the operator based on the calibration information.

68. An imaging device as recited in claim 67, further comprising:

a calculation unit to calculate the visual line of the operator based on the calibration information input from the calibration information input device, wherein the control unit sets focus control conditions and exposure control conditions based on the calculated visual line.

* * * * *